April 19, 1932.　　　C. PEARSON　　　1,854,806
MOWER
Filed April 19, 1930　　2 Sheets-Sheet 2
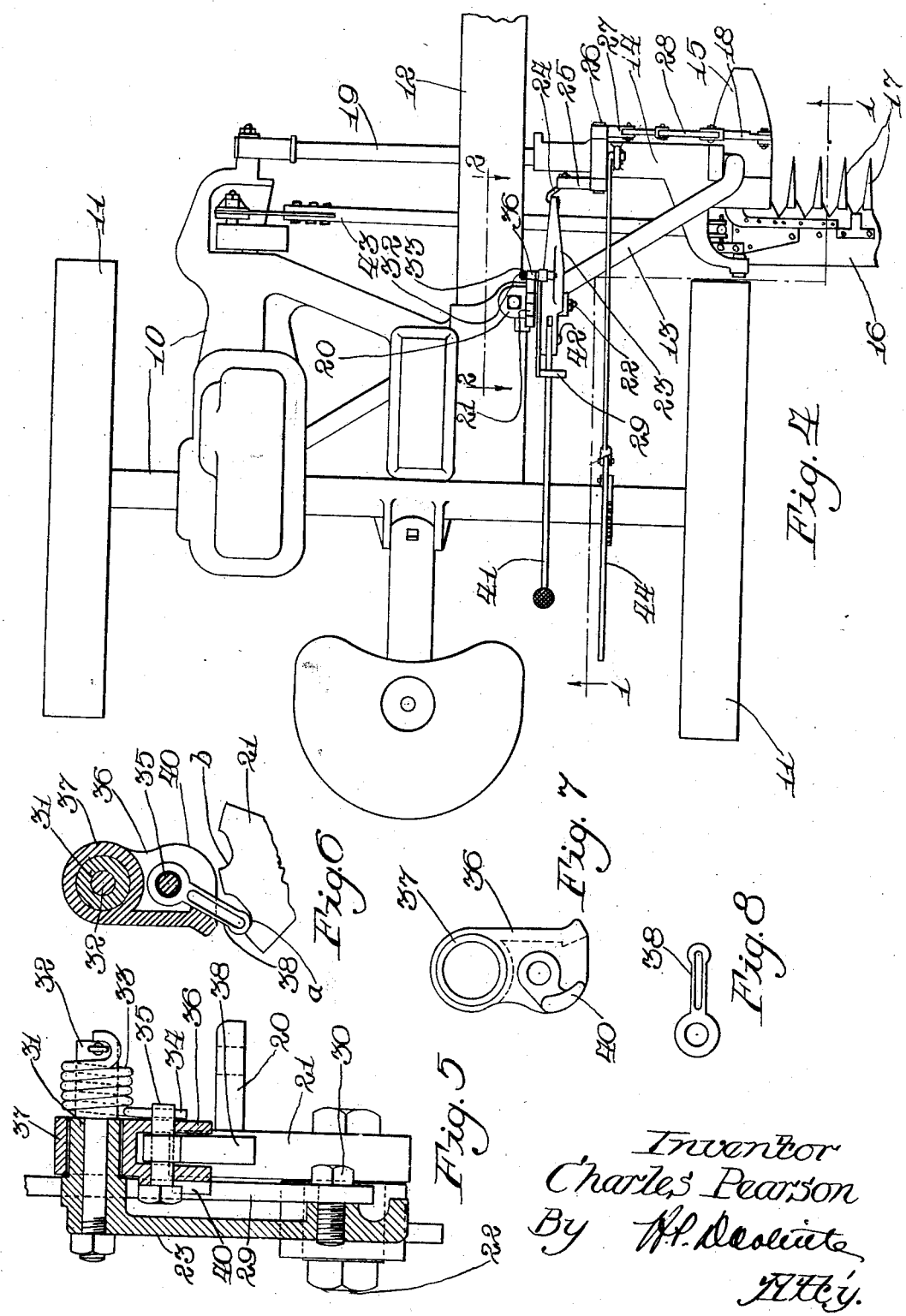
Inventor
Charles Pearson
By [signature]
Atty.

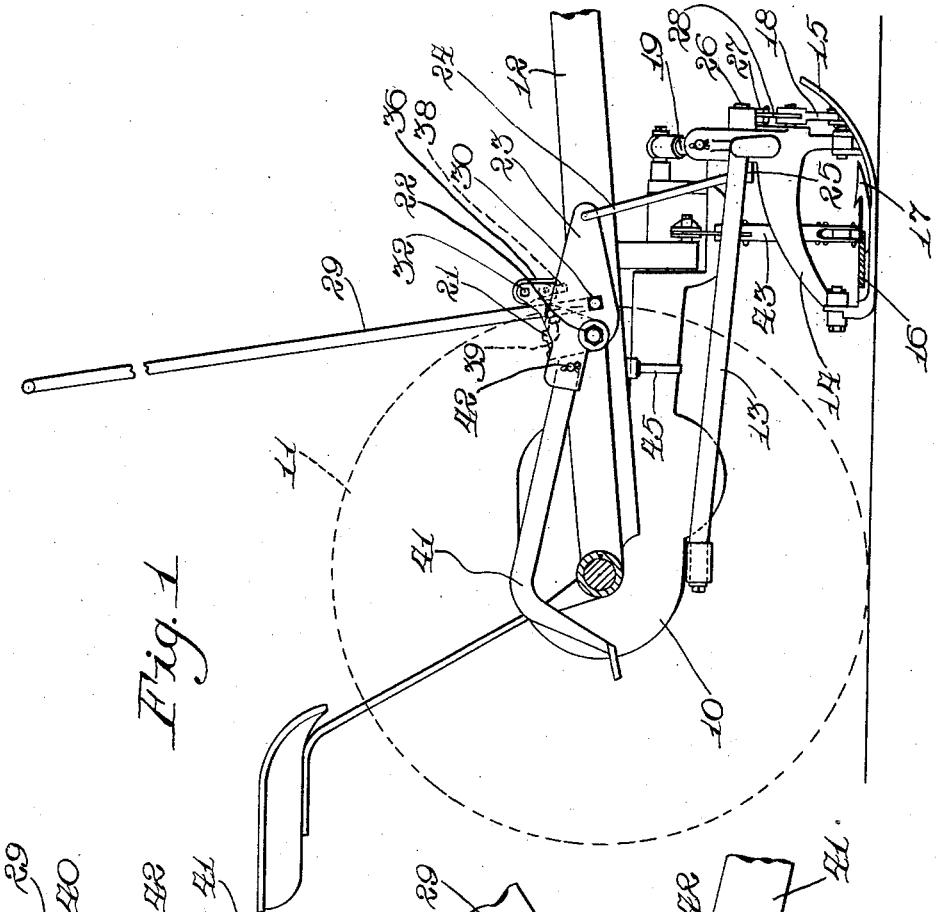

Patented Apr. 19, 1932

1,854,806

UNITED STATES PATENT OFFICE

CHARLES PEARSON, OF CICERO, ILLINOIS, ASSIGNOR TO INTERNATIONAL HARVESTER COMPANY, A CORPORATION OF NEW JERSEY

MOWER

Application filed April 19, 1930. Serial No. 445,752.

The invention relates to a mowing machine and especially to a lifting lever mechanism therefor to enable the operator to raise or lower the cutter bar.

Mowers all embody such lift levers and usually employ therewith the ordinary spring detent lock mechanism, which must be manually released each time the lever is used in adjusting the cutter bar. This is objectionable in many respects, and accordingly the main object of the present invention resides in the provision of an improved semi-automatic lifting lever lock mechanism which dispenses with the ordinary operator released spring detent lock mechanism.

A further object is to provide such semi-automatic lifting lever lock mechanism in which the parts are securely held in each position of adjustment without making it necessary for the operator first to actuate the detent mechanism, this improved mechanism being simple in its construction, having few parts, and being positive and safe in operation.

Other objects will be apparent to those skilled in this art as the disclosure is more fully made.

These objects are attained briefly in combination with a frame which pivotally carries a lifting arm, the arm pivotally carrying a lifting lever, there further being a notched sector plate on the frame, and peculiar pawl lock mechanism moved by the lever and arm and cooperable with the sector, all as will later more fully appear.

In the accompanying sheets of drawings illustrating a form of the invention by way of example:

Figure 1 is a side elevational view of a mower partly in section and embodying the improved lift mechanism, the parts being shown along the line 1—1 of Figure 4 and in the position assumed when the cutter bar is down in cutting position;

Figure 2 is a back side view of the lever lock mechanism per se, the parts being shown in the position assumed when the cutter bar is in plain or intermediate lift position. This view is taken along the line 2—2 of Figure 4;

Figure 3 is similar to Figure 2, but shows the parts in the position assumed when the releasing movement from high lift position of the cutter bar is initiated;

Figure 4 is a plan view of the mower shown in Figure 1;

Figure 5 is a front view of the structure shown in Figures 2 and 3, the lift arm and upper pawl appearing in section;

Figure 6 is a side elevational view, partly in section, of the upper and lower lock pawl assembly associated with the notched sector;

Figure 7 is a side elevational view of the upper pawl looking from the opposite side of the same part shown in Figure 6; and, Figure 8 is a detached, side elevational view of the lower pawl.

The mower shown comprises a main frame 10 supported on carrying wheels 11, the usual draw tongue 12 being connected to the frame. The frame has connected thereto the coupling bar 13, on the free end of which is journaled in the usual manner the coupling yoke 14. Said yoke has hinged thereto the inner shoe 15, which carries the cutter bar 16, to which the guard fingers 17 are connected. The shoe 15 carries a lever 18, and a supplementary coupling bar 19 is provided having the stubbleward end thereof pivotally connected to the main frame part 10, and its opposite end with the yoke 14.

Securely fixed to the frame is the flange 20 of a notched sector plate 21 having two notches as shown. The plate 21 carries a bolt 22 that pivotally carries a lifting arm 23, to the front end of which is pivotally connected a depending link 24, which in turn has its lower end connected to a crank arm 25 on a suitably journaled rockshaft 26 at one end thereof, while the other end of said shaft carries a second crank arm 27 connected by a common form of link mechanism 28 to the lever 18 heretofore mentioned.

A hand lift lever 29 is connected by a bolt 30 to the lift arm 23 eccentrically of the pivotal mounting of said lift arm, said lever having a slight free or independent movement in either direction with respect to the lift arm.

At an intermediate point and at its top, the lifting arm is formed with a sleeve extension 31, through which is extended a bolt 32 carrying on a free exposed end a coil spring 33 under compression, and having a leg extension 34 passed through a bolt 35 carried in a channel shaped upper pawl 36 formed with a sleeve 37, so that the pawl 36 may be rockably and pendulously carried on said sleeve extension 31. See Figures 5, 6 and 7. The pin 35 pivotally carries a lower pawl member 38 located between the sides of the upper pawl member 36, said pawl 38 cooperating with the notched sector plate 21. The pin 35 thus in effect forms the break point of a toggle link comprising the upper and lower pawl members 36 and 38. Further, the spring 33 exerts a force tending to move the break point of said toggle link over dead center and toward the rear. The hand lift lever 29 plays between the extension 31 on the lift arm 23 and a stop 39 also on the lift arm, said lever also being engageable with a boss 40 extending from the lower end of one side of the upper pawl 36, whereby said lever may move the break point to throw it away from its over dead center lock position to overcome the spring pressure and release the pawl 38 from locking engagement with the sector.

The usual foot lever 41 is provided by pivotally connecting the same at 42 to the lifting arm 23 in any well known manner to cause said foot lever to operate as an assisting means when manually moving the hand lift lever 29. The usual pitman drive for the sickle is indicated at 43 and the cutter bar tilt control lever at 44. Numeral 45 represents a depending stop member secured to the main frame of the machine and adapted to contact with the coupling bar 13 when said bar has been raised to a predetermined height, as is usual in mowers. The operation and manner of use of the improved lift lever lock mechanism will now be described.

Let us start with the parts in position, as shown in Figures 1 and 2, where the cutter bar is lying on the ground in its cutting position. As shown, the lever 29 is not latched and the toggle pawls 36 and 38 are free in a position forwardly of the notched sector plate 21 and with the cutter bar held down by its own weight. As the machine passes through the field we will assume an obstruction must be avoided by raising the cutter bar to its intermediate or so called plain lift position. Accordingly, the operator from his station on the mower seat grasps the lever 29 and manually moves the same rearwardly, the lever moving freely until it contacts the stop 39 to pick up the lifting arm 23 and cause said arm 23 to turn about its pivot 22 until the lower pawl 38 slides over the top front corner of the sector plate 21 and drops in to the first notch. As the spring 33 always acts to push the break point of the pawl toggle 36—38 rearwardly, the lower pawl 38 now seats in the seat $a$ of the said first notch, as shown in Figure 2. The lever 29 now having been stopped, the break point of pin 35 of said toggle, under the action of the spring, moves over dead center and the lower pawl thus carries the entire weight of the coupling frame and cutter bar latch against displacement, thereby locking the frame and bar in the plain lift position. If it is now desired to return the coupling frame and cutter bar to ground position, the lever 29, which it will be remembered has a slight free movement, is moved toward the front until it contacts the boss 40 on the upper pawl 36. Continued movement of the lever now pushes on said boss to move the break pin 35 over dead center in the opposite direction against the force exerted by the spring 33, thereby unlocking the pawl toggle to permit the weight of the raised frame and cutter bar to drop by gravity back to the position shown in Figure 1. When this happens, the lower pawl 38 merely slides idly back over the sector, as will be understood and as indicated in Figure 3, where the pawl is shown releasing from high lift position out of the notch seat $b$.

If it is desired to move the cutter bar to high or absolute vertical position, the hand lever 29, assisted by the foot lever 41, is moved backwardly, as has already been described, until the coupling frame encounters the stop 45. The pawl 38 thus rides over the first notch in the sector plate 21, and continued movement of the lever and, of course, the lift arm 23 rides the said pawl 38 into the last notch, and, under the action of the spring 33, causes said pawl to seat stiffly in the notch seat $b$ because the toggle break point is passed over dead center in a rearward direction. Thus, through the connections 24, 25, 26, 27, etc., the cutter bar has been raised to vertical position with the weight carried by the pawl 38 of the locked toggle means 36, 38. In returning the cutter bar to ground position, the hand lever 29 is moved forwardly, as shown in Figure 3, until it engages the boss 40 to break the toggle lock, whereupon the parts of their own weight fall by gravity, thus returning the cutter bar to the ground. Thus an important advantage of the collapsible toggle pawl arrangement resides in the fact that the cutter bar can be lowered from high lift position all the way to ground position without having to lock the pawl 38 in any intermediate position; nor can this pawl lock accidentally as the bar drops. In this respect the toggle lock is fool proof and prevents damage to the lock parts.

From this detailed description and disclosure, it must now be appreciated that structure of simple type has been provided, which achieves all of the desirable objects of the invention heretofore recited.

It is the intention to cover all such immaterial changes as do not depart from the spirit and scope of the invention as hereinafter claimed.

What is claimed is:

1. In combination, a frame, a notched sector mounted on the frame, a lift arm pivotally carried by the frame, a lever pivoted to the arm for limited independent movement relative thereto, and pawl mechanism between the arm and sector comprising a toggle link releasable upon movement of the lever in opposite directions and normally locking said arm against movement in one direction.

2. In combination, a frame, a notched sector mounted on the frame, a lift arm pivotally carried by the frame, a lever pivoted to the arm for limited independent movement relative thereto, and pawl mechanism between the arm and sector comprising upper and lower pawls pivotally connected to form a toggle link releasable upon movement of the lever in opposite directions and normally locking the arm against movement in one direction.

3. In combination, a frame, a notched sector mounted on the frame, a lift arm pivotally carried by the frame, a lever pivoted to the arm for movement in opposite directions, a pair of pawls pivotally connected to form a toggle link between the arm and sector and releasable upon movement of the lever in either direction, and a spring acting on one of the pawls to cause said toggle link normally to lock the arm against movement in one direction.

4. In combination, a frame, a lifting arm pivoted thereon and adjustable in a plurality of positions with respect thereto, a lifting lever pivoted to said arm, a sector carried on the frame, and a pivoted pawl comprising part of a spring urged toggle mechanism carried by the lifting arm and engageable with the sector for retaining said arm in its different positions of adjustment.

5. A mowing machine including, in combination, a rising and falling coupling frame, a cutter bar hinged thereto, means for swinging said bar to a vertical position comprising a pivoted lifting arm, a notched sector concentric with the axis of said arm, a hand lever pivoted upon said arm eccentric to its axis, and means including a pivoted pawl carried by the lift arm and engaging the sector for locking the coupling frame in a raised position, said pawl being released upon movement of the lever in a direction to lower the cutter bar.

6. A mowing machine including, in combination, a mower frame, a rising and falling coupling frame operatively connected thereto, a cutter bar hinged to said coupling frame, means for swinging said cutter bar to a substantially vertical position comprising a lift arm pivotally carried on the mower frame and operatively connected to the coupling frame and cutter bar, a lever for moving the lift arm, a notched sector plate on the mower frame, and a toggle pawl mechanism carried by the lift arm for locking in the notched sector whereby said lift arm is locked and the pawl mechanism sustains the weight of the coupling frame and cutter bar, said toggle pawl mechanism being contactible by the lever upon movement thereof in a reverse direction to collapse the toggle mechanism whereupon the cutter bar and coupling frame return by gravity to ground position and the toggle pawl rides idly over the sector without locking therewith.

7. In a mower comprising a frame carrying a notched sector, a lift arm pivotally carried by the frame adjacent the sector, a cutter bar connected to be adjusted by the lift arm, a sleeve carried by the upper part of the lift arm to extend laterally thereof above the sector, a pawl pivotally hung from the sleeve, said pawl having pivotally connected to it a second pawl engageable with the notched sector, and a lever pivotally connected to the lift arm to have slight independent movement relative thereto, said lever in operation being engageable with a portion of the first pawl and also with the sleeve.

8. In a mower comprising a frame carrying a notched sector, a lift arm pivotally carried by the frame adjacent the sector, a cutter bar connected to be adjusted by the lift arm, a sleeve carried by the upper part of the lift arm to extend laterally thereof above the sector, a pin carried in the sleeve, a pair of connected pawls forming a toggle link pivotally hung from the sleeve to engage the notched sector, a coil spring on the pin exerting pressure on the break point of said toggle link, and a lever pivotally connected to the lift arm to have slight independent movement relative thereto, said lever in operation being engageable with a portion of one of the pawls and also with the sleeve.

In testimony whereof I affix my signature.

CHARLES PEARSON.